Feb. 25, 1964 R. E. PRICE 3,122,133
PRELOADED SUPPORTING MEANS FOR GRINDING MACHINE TOOL HOLDERS
Filed Aug. 11, 1959 6 Sheets-Sheet 1

INVENTOR
R. E. PRICE

BY *Mason, Porter, Miller & Stewart*

ATTORNEYS

R. E. PRICE
INVENTOR

BY Mason, Porter, Miller & Stewart

ATTORNEYS

R. E. PRICE
INVENTOR

United States Patent Office 3,122,133
Patented Feb. 25, 1964

3,122,133
PRELOADED SUPPORTING MEANS FOR GRINDING MACHINE TOOL HOLDERS
Ralph E. Price, Waynesboro, Pa., assignor to Landis Tool Company, Waynesboro, Pa., a corporation of Pennsylvania
Filed Aug. 11, 1959, Ser. No. 832,956
14 Claims. (Cl. 125—11)

The invention of which the following is a description, relates to preloaded supporting means for grinding machine tool holders.

In the dressing of grinding wheels by means of diamond dressing tools there are definite limitations resulting from the difficulty of suitably feeding the dressing tool along a profile guide or plate. One of the principal problems in such work is that of accomplishing a satisfactory movement of the guiding follower on the dressing tool upwardly on an oblique profile. The greatest angle at which such a follower can move upwardly on the oblique profile is not sufficiently great to include many forms required on grinding wheels. Consequently profile dressers have been designed so that the oblique portions of the grinding wheel forms are dressed only in the direction of traverse in which the follower can move downwardly on the inclined portions of the profile plate. A limiting factor in this operation has been the inability of maintaining maximum rigidity and minimum friction in the movement of the dresser bar.

It is an object of this invention to provide a mounting for a dresser bar which will have maximum rigidity and minimum resistance to friction in operating over the required profile.

Another object of the invention is to provide anti-friction members which are sufficiently elongated to support the dresser bar over a substantial portion of its length.

A further object of the invention is to provide means for preloading the anti-friction members so that increased rigidity will result.

By way of example I have shown the preferred form of the invention on the accompanying drawings in which.

Figure 1:
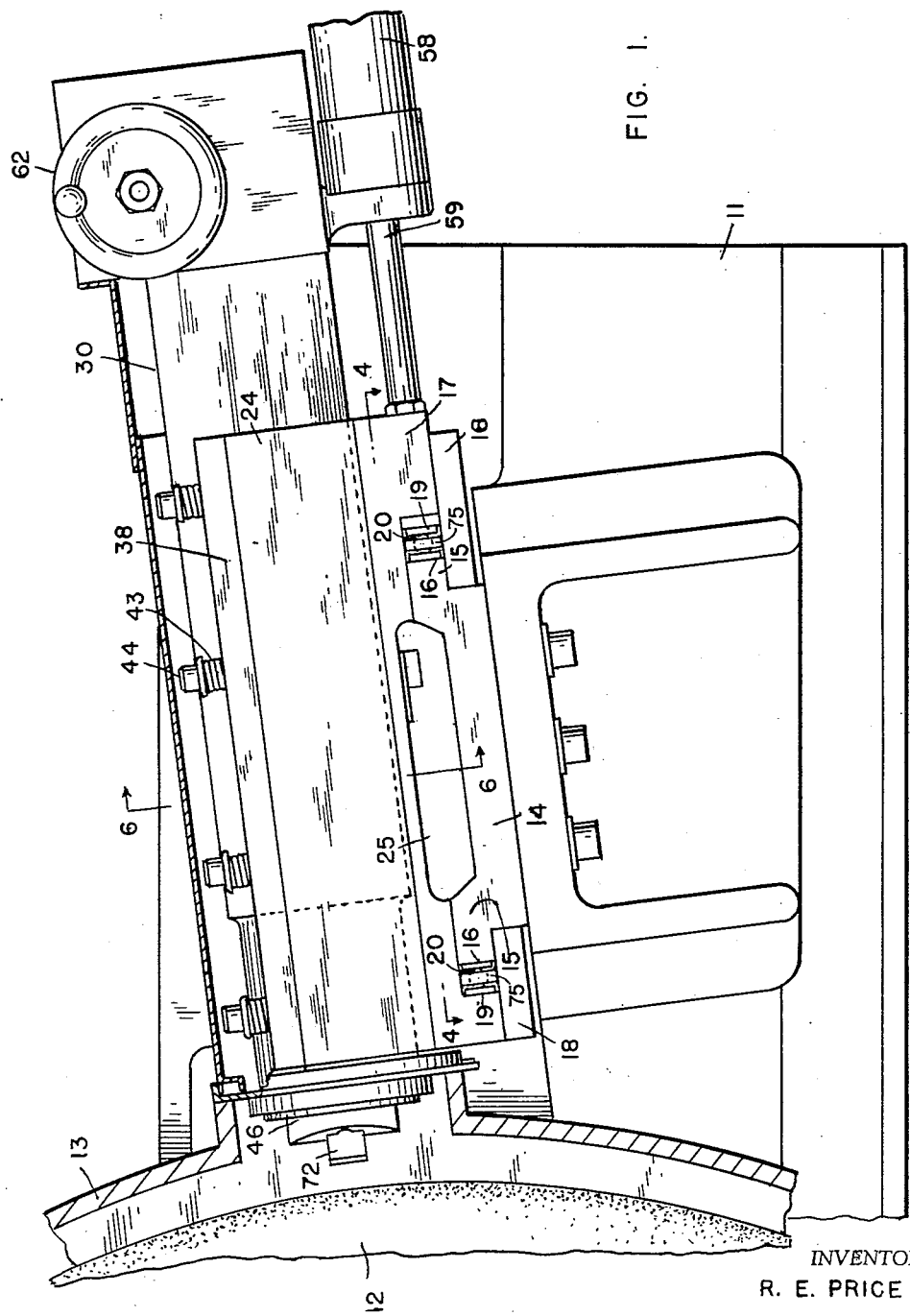
FIG. 1 is a side elevation of the improved profile dresser for a grinding wheel.
Figure 2:
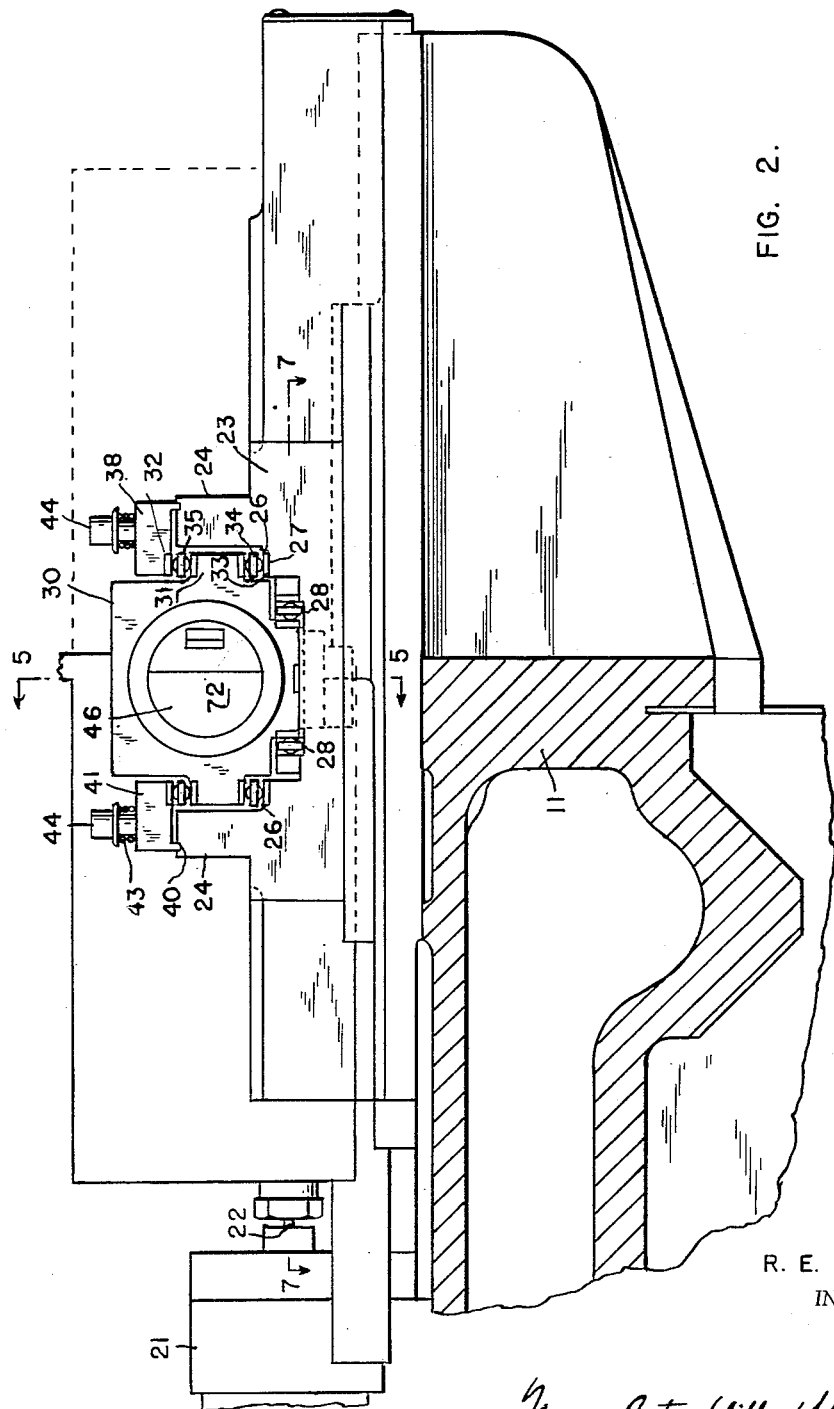
FIG. 2 is a front end elevation of the same.
Figure 3:
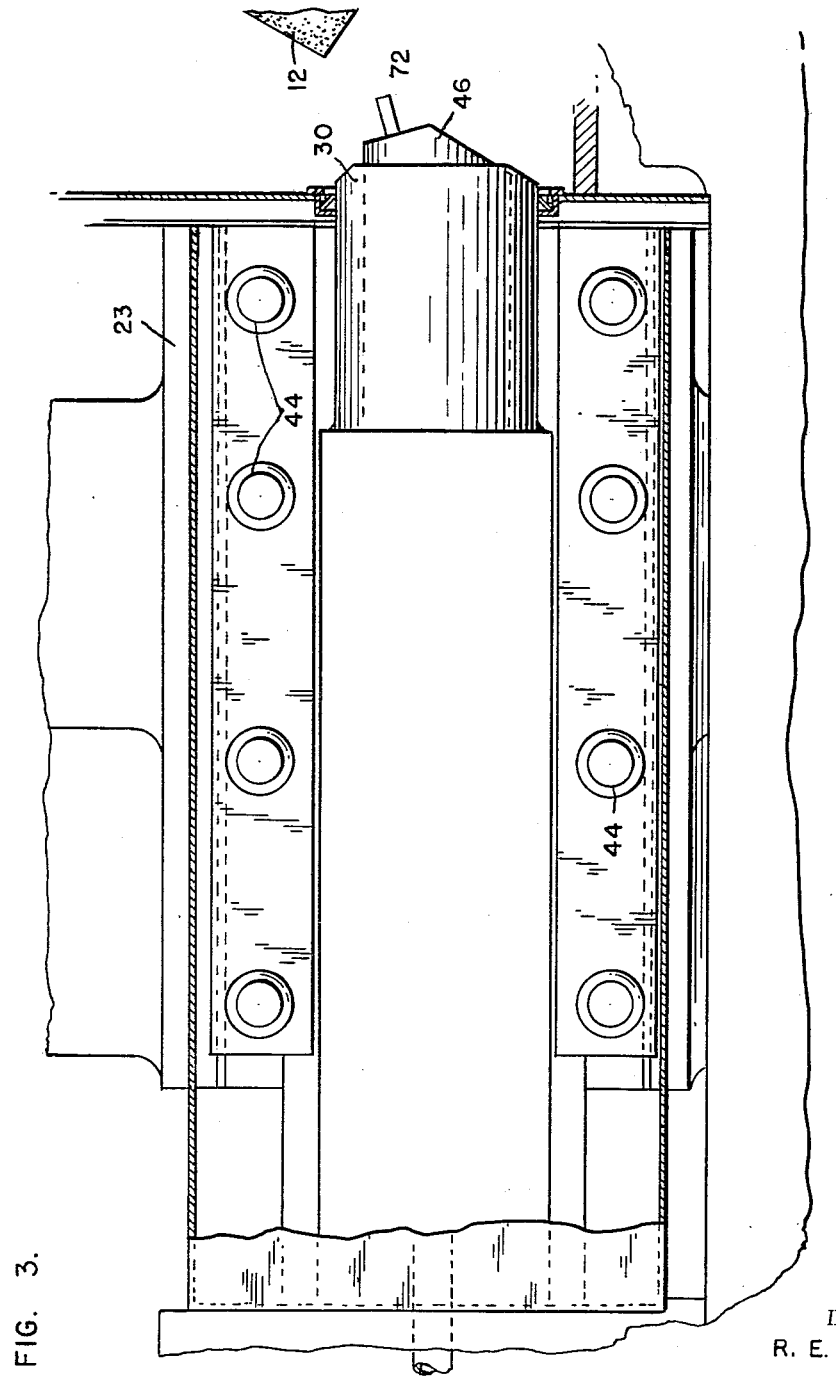
FIG. 3 is a plan view of the dresser.
Figure 4:
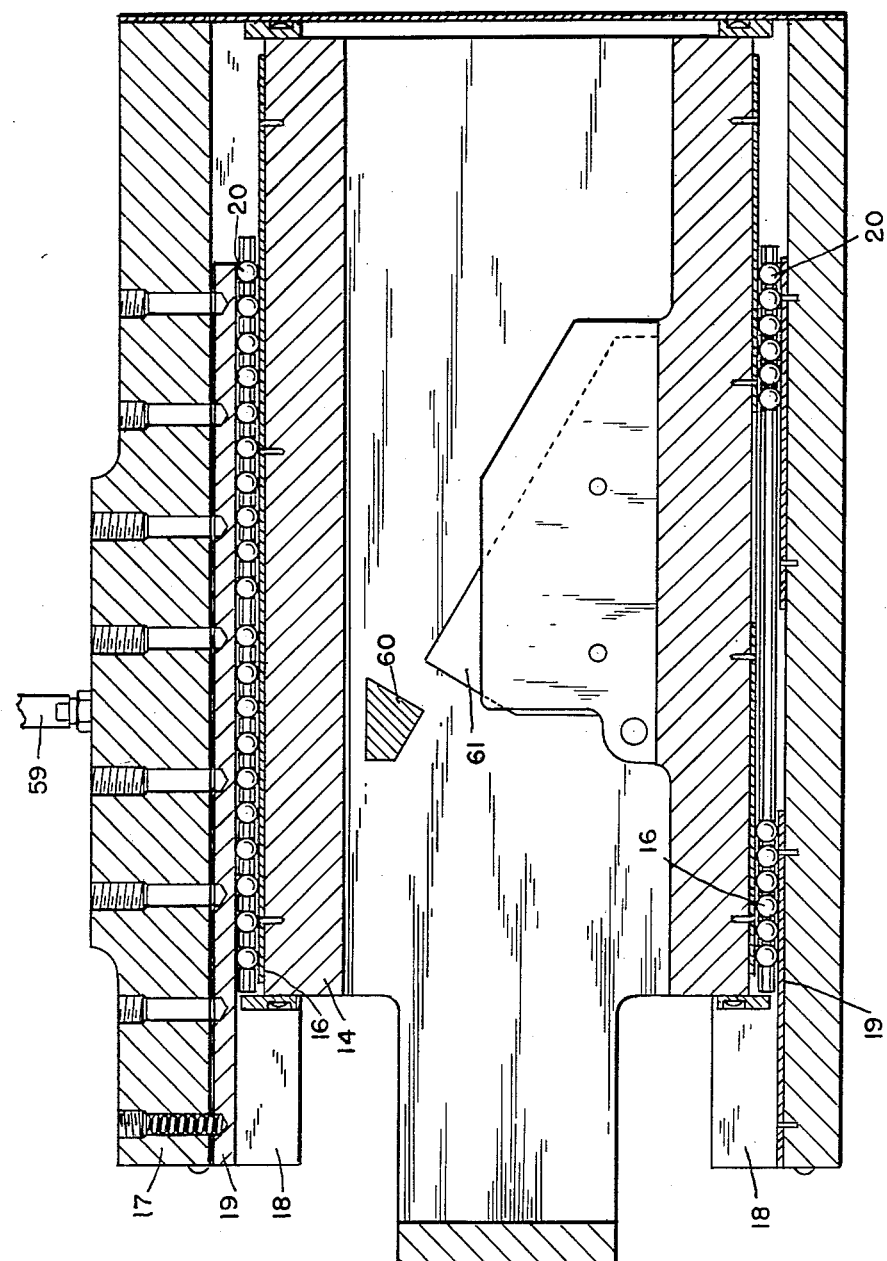
FIG. 4 is a horizontal sectional view taken on the line 4—4 in FIG. 1.

Briefly speaking, the improved device consists of means for supporting the bar slide of the diamond bar on reciprocal anti-friction bearings, preventing the slide and bar from rocking in a vertical plane or swinging in a horizontal plane. This anti-friction means of support permits accurate and finely graduated movements. In the dressing operation, the slide and dressing bar are held with the utmost rigidity in both horizontal and vertical plane. As a practical matter, this result is accomplished by preloading the reciprocating bearings both vertically and horizontally.

On the drawings I have shown a swivel base 11 which is adjustably mounted opposite a grinding wheel 12. The grinding wheel rotates within the grinding wheel casing 13. The swivel base 11 carries a fixed crossway 14 having overhanging side edges 15, 15. Each side edge carries a raceway 16, 16. A traversing slide 17 is provided having the center of its bottom face cut away to slide on the face of the crossway 14. The slide 17 is provided with shoes 18, 18, which extend inwardly under the overhanging edges 15, 15 to maintain the slide in contact with the face of the crossway 14. Raceways 19, 19 are mounted on the slide 17 opposite the raceway 16, 16 on the crossway. Reciprocating ball bearings 20, 20 in linear retainers 75 are interposed between each pair of raceways 16 and 19.

The lateral movement of the traverse slide is provided by a reciprocating motor 21 having a piston rod which is connected to the traversing slide by means of a bar 22 in the form of a narrow spring band which will minimize any undesired vibration present in the traversing motor 21.

The traverse slide 17 forms a support for a carriage 23. This carriage has a pair of parallel, opposite walls 24, 24. The bottom of the carriage between the walls 24, 24 is cut away as at 25 to provide passageway of the follower 60 for the profile bar 61.

Suitable retainers 26, 26 are arranged in spaced, parallel relationship on the carriage between and below the walls 24, 24.

The bottom surfaces of the retainers 26, 26 are provided with raceway 27, 27.

Beneath the level of the retainers 26, 26, the carriage also provides opposite, parallel steps 28, 28. Each of these steps has a hardened raceway 29. These steps are closely adjacent to the opening 25 in the bottom of the carriage.

A bar slide 30 is provided to extend movably between the opposite walls 24, 24 of the carriage. This bar slide has side runners or shoulders 31, 31, which overlie the retainers 26, 26. Each runner 31 is provided with hardened top and bottom raceways 32 and 33 respectively. Reciprocal anti-friction bearings 34, 35 rest respectively upon the raceways 27 and the raceways 32. These anti-friction bearings are in the form of bearing balls 36, suitably held by straight retainers or cages 37.

Gibs 38 are provided at the top of each wall 24. Each gib 38 has a lower rear edge 39 fitting within a groove 40 of the wall. The opposite or front portion 41 of the gib 38 has a hardened raceway 42 on its lower surface overhanging the ball bearing 35.

The top of the gib 38 is recessed at spaced points to receive a coil spring 43. A bolt 44 having a shoulder 45 extends through the coil spring 43 into wall 24. The bolt thus gives adjustable pressure to the gib 38 and preloads the bearings 34 and 35.

A cylindrical diamond bar 46 for a diamond dressing tool is journaled in the slide 30. The upper portion of the bar 46 is cut away to form a longitudinal rib or key 47.

The slide 30 is drilled transversely to receive a pin 48. This pin has a center transverse groove 49, which fits over the key 47.

The opposite ends of the pin 48 are held in adjusted position by means of screw plugs 50, 50, threaded into the slide 30.

The bar slide 30 has a narrowed bottom runner 51 opposite the raceway 29 of the carriage. This runner has hardened vertical raceways 52, 52.

Figure 6:
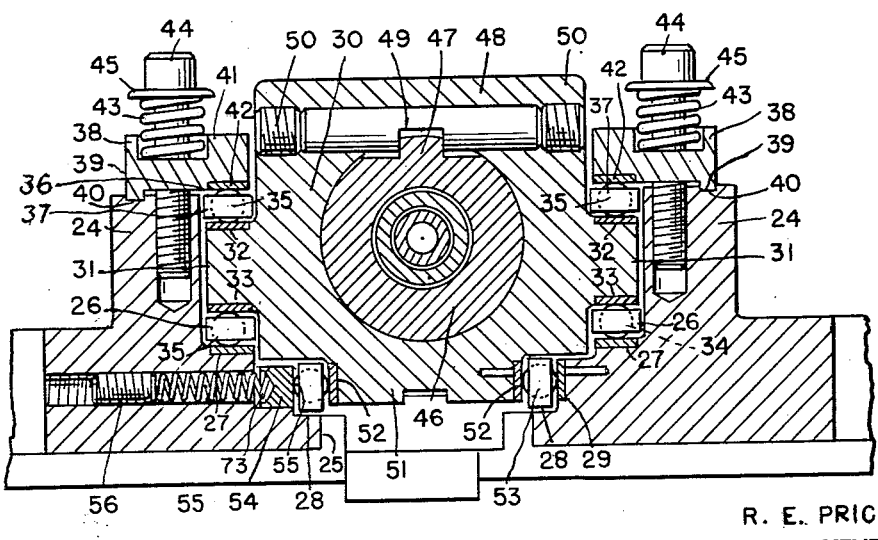
FIG. 6 is a vertical transverse sectional view taken on the line 6—6 on FIG. 1.

A reciprocal ball bearing 53 as described above, is located between the raceway 29 and the raceway 52 on the right of the runner 51, as shown in FIG. 6.

On the left of the runner, as shown in FIG. 6, the step 28 carries a raceway 54. This has a hardened inner wall opposite the hardened raceway 52. A reciprocal ball bearing 55 rests upon the step between the raceways 52—54.

The raceway 54 is backed by a series of springs 73 which are held in transverse passageways in the carriage 23. Each spring 73 is maintained under suitable tension by screw plugs 56. Where the width of the carriage at this point demands, the space between each spring 73 and the plug 56 is occupied by spacer rods 57.

The bar slide is moved longitudinally of the above-described preloaded bearing support by means of a pressure cylinder 58 which is mounted beneath the slide 30. The cylinder 58 is moved by pressure applied against a piston rod 59 within the cylinder and fixedly mounted on the traverse slide 17.

The bottom of the bar slide 30 carries a follower 60 which extends downwardly through the opening 25 in the carriage 23, as shown in FIG. 6.

This follower 60 travels against a profile bar 61 having oblique or inclined edges and fixedly mounted on the upper depressed surface of the crossway 14.

Figure 5:
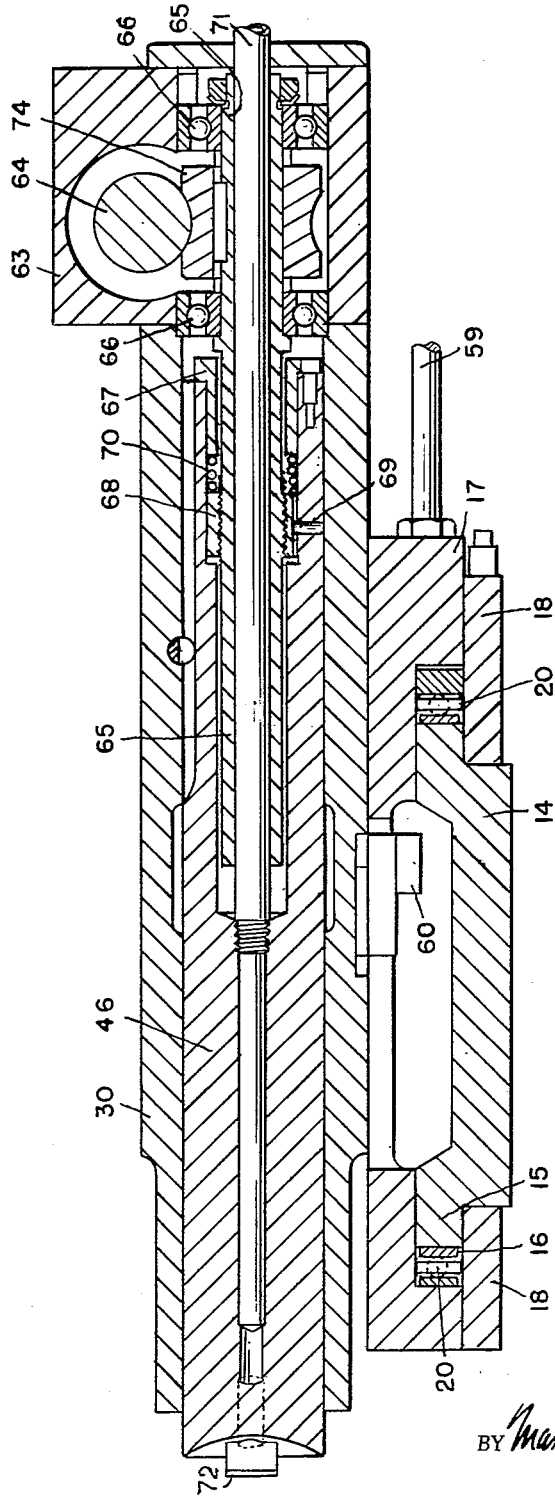
FIG. 5 is a vertical longitudinal sectional view taken on the line 5—5 in FIG. 2.
Figure 7:
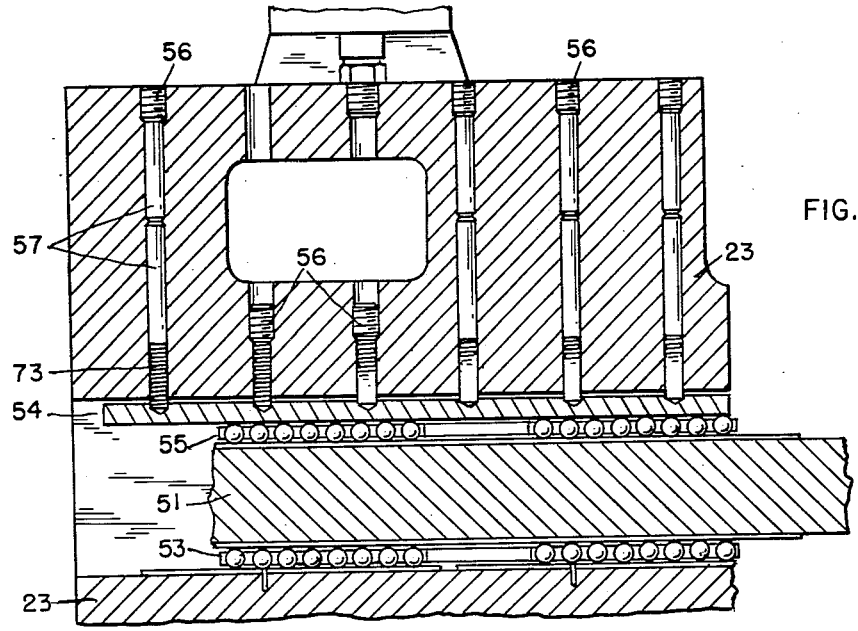
FIG. 7 is a horizontal longitudinal sectional view taken on the line 7—7 in FIG. 2.

The diamond bar 46 is subject to manual adjustment for wear by means of a handwheel 62. This handwheel is mounted on a housing 63 forming part of the bar slide 30. A cross shaft 64 in the housing 63 is screw-threaded and in engagement with the worm gear 74 shown in FIG. 5.

The worm gear 74 is keyed to a sleeve 65 rotatable in bearings 66, 66 in the housing. The sleeve 65 passes through a collar 67 bolted on the end of the diamond bar 46.

The diamond bar 46 has an axial passageway through which the sleeve 65 passes. A nut 68 located in this passageway is fastened against rotation by means of stud 69, which is fastened in a groove in the nut 68. The nut 68 is screw-threaded to a portion of the sleeve 65. The nut is held in advanced position by means of a spring 70 which is backed against the collar 67.

A central tube 71 is loosely carried within the sleeve 65 to provide for suitable cooling fluid to be delivered within the axial cavity of the diamond bar.

The front end of the diamond bar carries a reciprocable diamond dressing tool 72.

As indicated in FIG. 1, the crossway 14 is tilted downward so that the carriage 23 moves in a downwardly inclined plane toward the wheel to be dressed. The crossway 14 may be traversed laterally by the motor 21. This adjusts the position of the profile bar 61.

Movement of the fluid pressure cylinder 58 along the rod 59 advances the carriage 23 toward the grinding wheel. This advance is given a transverse movement as the follower 60 is controlled by the profile bar 61.

In this advance the bar slide 30 is held against vertical displacement by means of the preloaded reciprocal bearings 34, 35.

Likewise transverse longitudinal movement is prevented by the preloaded bearings 53, 55.

The lengths of the several reciprocal bearings are such as to support the bar slide 30 for the greater part of its length.

By this arrangement the bar slide is free to move longitudinally but held against lateral or vertical movement due to the pressure either of the work or of the follower.

While I have shown the preferred form of my invention for purposes of example, minor changes in arrangement, material and proportions are permissible within the scope of the invention as defined in the following claims.

What I claim is:

1. A dresser for a profiled grinding wheel comprising a fixed crossway, a profile plate thereon, a traversing slide on the crossway, means for moving said slide transversely on the crossway, a carriage on the slide, spaced parallel tracks on the carriage, reciprocable antifriction bearings on each track, a bar slide supported on the bearings, a follower depending from the bar slide for engagement with the profile plate, means for adjustably holding a diamond bar in the bar slide, spaced parallel tracks on the bar slide above the carriage tracks, reciprocable antifriction bearings on said bar slide tracks, gibs on the carriage over the last named bearings and spring tension means urging the gibs against the upper bearing of each superposed pair.

2. A dresser for a profiled grinding wheel comprising a fixed crossway, a profile plate thereon, a traversing slide on the crossway, means for moving said slide transversely on the crossway, a carriage on the slide, spaced parallel tracks on the carriage, reciprocable antifriction bearings on each track, a bar slide having lateral shoulders supported on the bearings, a follower depending from the bar slide for engagement with the profile plate, means for adjustably holding a diamond bar in the bar slide, spaced parallel tracks on the shoulders of the bar slide above the carriage tracks, reciprocable antifriction bearings on said bar slide tracks, gibs on the carriage over the last named bearings and spring tension means urging the gibs against the upper bearing of each superposed pair.

3. A dresser for a profiled grinding wheel comprising a fixed crossway, a profile plate thereon, a traversing slide on the crossway, means for moving said slide transversely on the crossway, a carriage on the slide, spaced parallel tracks on the carriage, reciprocable antifriction bearings on each track, a bar slide supported on the bearings, a follower depending from the bar slide for engagement with the profile plate, means for adjustably holding a diamond bar in the bar slide, spaced parallel tracks on the bar slide above the carriage tracks, reciprocable antifriction bearings on said bar slide tracks, gibs pivotally mounted on the carriage and overhanging the last named bearings and spring tension means for urging the gibs against the upper bearing of each superposed pair.

4. A dresser for a profiled grinding wheel comprising a fixed crossway, a profile plate thereon, a traversing slide on the crossway, means for moving said slide transversely on the crossway, a carriage with opposing vertical walls on the slide, spaced parallel tracks on the carriage, reciprocable antifriction bearings on each track, a bar slide supported on the bearings, a follower depending from the bar slide for engagement with the profile plate, means for adjustably holding a diamond bar on the bar slide, means for reciprocally guiding said bar slide between said carriage walls, an outer pair of opposed vertical raceways carried by said carriage, an inner pair of opposing raceways on the bar slide, reciprocatable antifriction means interposed between each opposing pair of raceways and means for applying tension on one outer raceway.

5. A dresser for a profiled grinding wheel comprising a fixed crossway, a profile plate thereon, a traversing slide on the crossway, means for moving said slide transversely on the crossway, a carriage with opposing vertical walls on the slide, spaced parallel tracks on the carriage, reciprocable antifriction bearings on each track, a bar slide supported on the bearings, a follower depending from the bar slide for engagement with the profile plate, means for adjustably holding a diamond bar on the bar slide, means for reciprocally guiding said slide between said carriage walls, a vertical raceway on the carriage opposite one raceway on the bar slide, a movable vertical raceway on the carriage opposite the other raceway on the bar slide and spring tension means between said last named raceway and the carriage.

6. A dresser for a grinding wheel comprising a fixed crossway, a traversing slide on the crossway, means for moving said slide transversely on the crossway, a carriage on the slide having inner vertical walls with opposing upper and lower steps, horizontal tracks on the two upper steps, lower reciprocable antifriction bearings on each track, a bar slide supported on said bearings, an upper reciprocable antifriction bearing on the bar slide above each lower bearing, spring tension means acting on the upper bearings, a vertical track member on the outer wall of one lower step, a movable track member on the opposite lower step, reciprocable antifriction means between the bar slide and each track member and spring tension means acting on the movable track member.

7. A dresser for a grinding wheel comprising a fixed crossway, a traversing slide on the crossway, means for moving said slide transversely on the crossway, a carriage on the slide, spaced parallel tracks on the carriage, reciprocable antifriction bearings on each track, a bar slide supported on the bearings, means for adjustably holding a diamond bar in the bar slide, spaced parallel tracks on the bar slide above the carriage tracks, reciprocable antifriction bearings on said bar slide tracks, gibs on the carriage over the last named bearings and spring tension means urging the gibs against the upper bearing of each pair of opposed antifriction bearings.

8. A dresser for a grinding wheel comprising a fixed crossway, a traversing slide on the crossway, means for moving said slide transversely on the crossway, a carriage on the slide, spaced parallel tracks on the carriage, reciprocable antifriction bearings on each track, a bar slide having lateral shoulders supported on the bearings, means for adjustably holding a diamond bar in the bar slide, spaced parallel tracks on the shoulders of the bar slide above the carriage tracks, reciprocable antifriction bearings on said bar slide tracks, gibs on the carriage over the last named bearings and spring tension means urging the gibs against the upper bearing of each pair of opposed antifriction bearings.

9. A dresser for a grinding wheel comprising a fixed crossway, a traversing slide on the crossway, means for moving said slide transversely on the crossway, a carriage on the slide, spaced parallel tracks on the carriage, reciprocable antifriction bearings on each track, a bar slide supported on the bearings, means for adjustably holding a diamond bar in the bar slide, spaced parallel tracks on the bar slide above the carriage tracks, reciprocable antifriction bearings on said bar slide tracks, gibs pivotally mounted on the carriage and overhanging the last named bearings and spring tension means for urging the gibs against the upper bearings of each pair of opposed antifriction bearings.

10. A dresser for a grinding wheel comprising a fixed crossway, a traversing slide on the crossway, means for moving said slide transversely on the crossway, a carriage with opposing vertical walls on the slide, spaced parallel tracks on the carriage, reciprocable antifriction bearings on each track, a bar slide supported on the bearings, means for adjustably holding a diamond bar on the bar slide, means for reciprocally guiding said bar slide between said carriage walls, an outer pair of opposed vertical raceways carried by said carriage, an inner pair of opposing raceways on the bar slide, reciprocable antifriction means interposed between each opposing pair of raceways and means for applying tension on one outer raceway.

11. A dresser for a grinding wheel comprising a fixed crossway, a traversing slide on the crossway, means for moving said slide transversely on the crossway, a carriage with opposing vertical walls on the slide, spaced parallel tracks on the carriage, reciprocable antifriction bearings on each track, a bar slide supported on the bearings, means for adjustably holding a diamond bar on the bar slide, means for reciprocally guiding said slide between said carriage walls, a vertical raceway on the carriage opposite one raceway on the bar slide, a movable vertical raceway on the carriage opposite the other raceway on the bar slide and spring tension means between said last named raceway and the carriage.

12. A compound slide mounting for a machine tool comprising a base, a carriage longitudinally slidable on the base, said carriage having lower parallel opposed vertical tracks and upper parallel horizontal tracks, a slide mounted on the carriage for movement transversely thereof, said slide having a depending portion between said vertical tracks, a reciprocable ball bearing between said depending portion and each vertical track, tension means against one of said tracks, said slide also having parallel lateral extensions, lower reciprocable ball bearings supporting said extensions on said horizontal tracks, an upper reciprocable ball bearing on each extension and separate tension means acting downwardly on each upper ball bearing.

13. A compound slide mounting for a machine tool comprising a base, a carriage longitudinally slidable on the base, said carriage having lower parallel opposed vertical tracks and upper parallel horizontal tracks, a slide mounted on the carriage for movement transversely thereof, said slide having a depending portion between said vertical tracks, a bearing having a cage and spaced balls between said depending portion and each vertical track, a series of spaced tension members acting on one of said vertical tracks, said slide also having parallel lateral extensions, a bearing having a cage and spaced balls supporting each lateral extension on a horizontal track of the carriage, a bearing having a cage and spaced balls resting on each said lateral extension and longitudinally extended pre-loading means bearing on each last named bearing.

14. In a supporting means for grinding machine tool holders, a base, guideways on said base, a member slidably mounted in said guideways, a tool on said slidable member, a reversible hydraulic motor for reciprocating said slidable member, connections between said motor and said slidable member including a piston rod and a narrow transversely resilient bar connecting said piston rod and the slidable member reducing lateral movement from the piston rod to the slidable member.

References Cited in the file of this patent

UNITED STATES PATENTS

| | | |
|---|---|---|
| 1,910,534 | Glasner | May 23, 1933 |
| 1,993,822 | Bergstrum et al. | Mar. 12, 1935 |
| 2,045,933 | Townsend | June 30, 1936 |
| 2,343,237 | McElroy et al. | Mar. 7, 1944 |
| 2,540,586 | Lauterbur | Feb. 6, 1951 |
| 2,565,687 | Hoier | Aug. 28, 1951 |
| 2,659,359 | Hill | Nov. 17, 1953 |

FOREIGN PATENTS

| | | |
|---|---|---|
| 683,055 | Great Britain | Nov. 19, 1952 |